No. 770,277. PATENTED SEPT. 20, 1904.
L. FIEDLER.
SECONDARY BATTERY.
APPLICATION FILED JUNE 28, 1904.
NO MODEL.
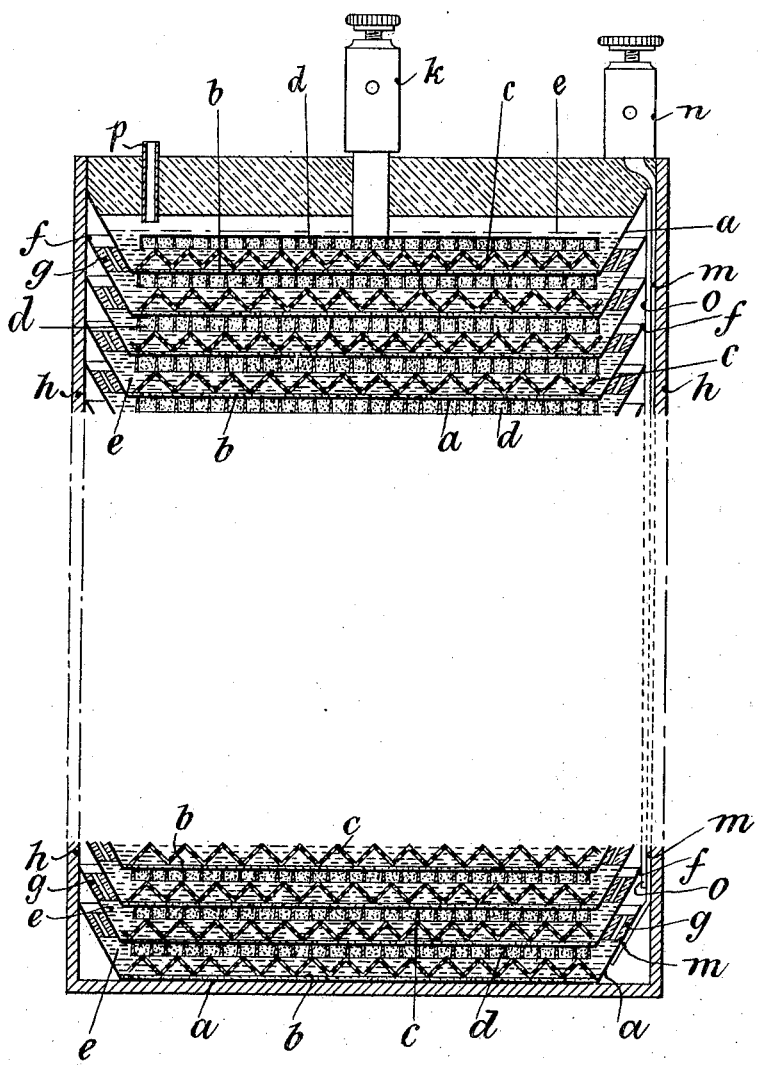

No. 770,277. Patented September 20, 1904.

UNITED STATES PATENT OFFICE.

LOTHAR FIEDLER, OF STOKE NEWINGTON, ENGLAND.

SECONDARY BATTERY.

SPECIFICATION forming part of Letters Patent No. 770,277, dated September 20, 1904.

Application filed June 28, 1904. Serial No. 214,540. (No model.)

*To all whom it may concern:*

Be it known that I, LOTHAR FIEDLER, electrical engineer, of $22\frac{1}{2}$ Cazenove road, Stoke Newington, in the county of Middlesex, England, have invented certain new and useful Improvements in Secondary Batteries; and I do hereby declare the following to be a full, clear, and exact description of the invention, such as will enable others skilled in the art to which it appertains to make and use the same.

This invention relates to an improved construction of secondary battery or accumulator in which the active surfaces are disposed in horizontal planes one above the other, the surfaces being the bottoms of a series of trays with shelving sides, each being immersed in the one next below, with its bottom well below the level of the electrolyte in the tray underneath. Such a form of construction possesses special advantages when the metal zinc forms one of the active elements or electrodes of the battery. It is well known that this metal is very susceptible to local action by the electrolyte when the external circuit is broken and the battery is intended to be inactive and that to lessen or entirely avoid such local action the zinc is amalgamated with mercury; but such amalgamation tends to diminish the consistency of the metallic element, and the amalgam gravitates to the lower situated portion of the area of the plate when such plates lie in planes more or less nearly vertical. The deterioration or disintegration of the plate due to this effect is further promoted by the tendency to a spongy condition of electrolytic deposit of zinc from the electrolyte when the battery is being charged, the deposit having thereby an opportunity of gravitating downward. These and other resulting evils, which more than counterbalance the considerable advantages of the high voltage and relatively great electrochemical value derivable from zinc, are entirely eliminated in a battery formed in accordance with this invention. In fact, the gravitation action, which operates destructively on vertically-situated plates, tends to consolidate the zinc-electrode element and maintain its homogeneity when the disposition is made in accordance with the arrangement of this invention.

The figure in the accompanying drawing shows a vertical section of an advantageous form of construction.

In the figure, $a$ is a shallow tray with shelving sides composed of thin metal of an acid-resisting nature, preferably lead. Over the bottom of this tray on the inside a lining $b$ is laid, consisting of a paste formed of finely-divided zinc thoroughly amalgamated with mercury. The lining $b$ forms one active element or electrode of the battery. Above this is situated an insulating-support $c$ for a superposed plate $d$, which plate $d$ forms the other active element or electrode of the battery. The insulating-support $c$ is so formed as to provide between the upper surface of $b$ and the lower surface of $d$ a space of such depth as to enable it to contain a sufficient quantity of electrolyte. It is conveniently and advantageously formed as a corrugated and perforated plate of vulcanite, celluloid, or other equivalent insulating material, such as vulcanized fiber. The plate $d$, which forms the positive-pole electrode, from which the electric current proceeds to the outer circuit on discharge of the battery, consists, preferably, of a lead grid the interstices of which are occupied by a paste of lead peroxid; but another substance which, in conjunction with the zinc amalgam lining $b$, is adapted to operate as a positive-pole electrode or element may be substituted for the grid containing lead peroxid. The plate $d$ is metallically connected with the under surface of a second tray $a$ by autogenous soldering or otherwise, and in this tray is placed a second lining $b$ and an insulating-support $c$. A succession of such trays $a$, linings $b$, insulating-supports $c$, and elements $d$ being superposed in the order described, a pile or battery will be formed commencing with a tray $a$ at the bottom and ending with an element $d$ at the top. If an external circuit is formed, joining the bottom tray $a$ to the top element $d$, the pile will operate in series and produce an electromotive force equal to the sum of the electromotive forces due to the several pairs of electrode elements.

The electrolyte $e$ may be liquid or in a gelatinous condition, and to avoid danger of spilling the upper edges $f$ of the sloping sides of each tray are made to extend well above the level of the bottom surface of the tray next above and enable the element $d$ to be quite submerged in the electrolyte. To still further avoid spilling and to prevent evaporation, a layer of paraffin-wax $g$ or other suitable material may be melted into the space between the shelving sides of the tray, care being taken to perforate the layers $g$ to permit the escape of gas.

For portable purposes the pile is inclosed in a box $h$ made of impermeable non-conducting material.

The positive terminal $k$ is secured to the uppermost element $d$, and the bottom tray $a$ by means of a strip of metal $m$ is joined up to the negative terminal $n$, a non-conducting strip $o$ being interposed to protect the conducting-strip $m$ from contact with the edges of the trays $a$ $a$.

$p$ is a vent-pipe for the escape of gases.

In a battery made as above described the zinc element is not required to have any strength and rigidity, and accordingly it may be formed of powdered zinc, with the advantage that every particle will be fully penetrated with mercury, and thereby protected from local action.

I claim—

1. A secondary battery composed of superposed cells, each of which consists of a combination of the following parts namely, a horizontally-placed layer of zinc amalgam serving as one electrode, a tray made with shelving sides and composed of acid-resisting material, the zinc amalgam forming an inside bottom to such tray, an insulating-support resting on the layer of zinc amalgam, an electrolyte occupying the interstices of the insulating-support and a second electrode of dissimilar metallic composition to the zinc amalgam, this second electrode being metallically connected with the zinc amalgam in the tray above.

2. A secondary battery composed of superposed cells, each of which consists of a combination of the following parts namely, a horizontally-placed layer of zinc amalgam serving as one electrode, a tray made with shelving sides and composed of acid-resisting material, the zinc amalgam forming an inside bottom to such tray, an insulating-support resting on the layer of zinc amalgam, an electrolyte occupying the interstices of the insulating-support and a second electrode, composed of lead peroxid, the second electrode being metallically connected with the zinc amalgam in the tray above.

3. A secondary battery composed of superposed cells, each of which consists of a combination of the following parts namely, a horizontally-placed layer of zinc amalgam serving as one electrode, a tray made with shelving sides and composed of lead, the zinc amalgam forming an inside bottom to the lead tray and in metallic connection therewith, an insulating-support resting on the layer of zinc amalgam, an electrolyte occupying the interstices of the insulating-support and a second electrode composed of lead peroxid metallically connected with the lead tray above.

4. A secondary battery composed of superposed cells, each of which consists of a combination of the following parts namely, a horizontally-placed layer composed of a paste of finely-divided zinc saturated with mercury serving as one electrode, a tray made with shelving sides and composed of acid-resisting material, the zinc amalgam forming an inside bottom to such tray, an insulating-support resting on the layer of zinc amalgam, an electrolyte occupying the interstices of the insulating-support and a second electrode of dissimilar metallic composition to the zinc amalgam, this second electrode being metallically connected with the zinc amalgam in the tray above.

5. A secondary battery composed of superposed cells, each of which consists of a combination of the following parts namely, a horizontally-placed layer of zinc amalgam serving as one electrode, a tray made with shelving sides and composed of acid-resisting material, the zinc amalgam forming an inside bottom to such tray, an insulating-support resting on the layer of zinc amalgam, an electrolyte in the condition of a jelly occupying the interstices of the insulating-support and a second electrode of dissimilar metallic composition to the zinc amalgam, this second electrode being metallically connected with the zinc amalgam in the tray above.

In testimony whereof I have hereunto set my hand in the presence of two subscribing witnesses.

LOTHAR FIEDLER.

Witnesses:
THOMAS ALFRED HEARSON,
WALTER J. SKERTEN.